United States Patent
Unterweger et al.

(10) Patent No.: US 12,446,123 B2
(45) Date of Patent: Oct. 14, 2025

(54) SYSTEM FOR INDIVIDUALLY CONTROLLING LIGHT-EMITTING DIODES (LEDS) AND CONTROLLING CLUSTERS OF LEDS AS UNITS

(71) Applicant: Infineon Technologies AG, Neubiberg (DE)

(72) Inventors: Gernot Unterweger, Latschach (AT); Adolfo De Cicco, Castel d'Azzano (IT)

(73) Assignee: Infineon Technologies AG, Neubiberg (DE)

( * ) Notice: Subject to any disclaimer, the term of this patent is extended or adjusted under 35 U.S.C. 154(b) by 246 days.

(21) Appl. No.: 18/311,613

(22) Filed: May 3, 2023

(65) Prior Publication Data

US 2024/0373521 A1  Nov. 7, 2024

(51) Int. Cl.
| | |
|---|---|
| H05B 45/10 | (2020.01) |
| F21K 9/00 | (2016.01) |
| F21Y 105/10 | (2016.01) |
| F21Y 115/10 | (2016.01) |
| H05B 45/30 | (2020.01) |

(52) U.S. Cl.
CPC .............. *H05B 45/10* (2020.01); *F21K 9/00* (2013.01); *H05B 45/30* (2020.01); *F21Y 2105/10* (2016.08); *F21Y 2115/10* (2016.08)

(58) Field of Classification Search
CPC ........ H05B 45/10; H05B 45/30; H05B 45/37; H05B 45/20; H05B 47/155; F21K 9/00; F21Y 2105/10; F21Y 2115/10
See application file for complete search history.

(56) References Cited

U.S. PATENT DOCUMENTS

| | | | |
|---|---|---|---|
| 6,473,002 B1 * | 10/2002 | Hutchison | G08G 1/095 362/555 |
| 11,291,259 B1 * | 4/2022 | Dugosh | F21V 5/04 |
| 2013/0038798 A1 * | 2/2013 | Takata | G02F 1/133603 349/62 |
| 2015/0358707 A1 * | 12/2015 | Saijo | H05B 47/12 381/386 |
| 2016/0307479 A1 * | 10/2016 | Cox | G09F 15/0037 |

(Continued)

FOREIGN PATENT DOCUMENTS

| | | | | |
|---|---|---|---|---|
| CN | 118900483 A | * | 11/2024 | F21K 9/00 |
| EP | 3721959 A1 | * | 10/2020 | E04F 13/08 |

(Continued)

*Primary Examiner* — Abdullah A Riyami
*Assistant Examiner* — Syed M Kaiser
(74) *Attorney, Agent, or Firm* — Shumaker & Sieffert, P.A.

(57) ABSTRACT

A system includes a light-emitting diode (LED) circuit comprising a set of LEDs arranged in a formation, wherein the set of LEDs comprise a set of LED clusters; and a controller. The controller is configured to: control, according to a first LED control mode, whether each LED of the set of LEDs is turned on or turned off; and control, according to a second LED control mode, whether each LED cluster of the set of LED clusters is turned on or turned off, wherein the first LED control mode requires the controller to use a first amount of computing resources, wherein the second LED control mode requires the controller to use a second amount of computing resources, and wherein the second amount of computing resources is lower than the first amount of computing resources.

19 Claims, 7 Drawing Sheets

(56) References Cited

U.S. PATENT DOCUMENTS

| | | | | |
|---|---|---|---|---|
| 2017/0118838 A1* | 4/2017 | Williams | ............... | H05K 3/361 |
| 2018/0224074 A1* | 8/2018 | Xiong | ....................... | F21K 9/27 |
| 2019/0356941 A1* | 11/2019 | Sullivan | ........... | H04N 21/41265 |
| 2021/0327204 A1* | 10/2021 | Lee | ..................... | G07F 17/3202 |
| 2021/0338866 A1* | 11/2021 | Grenon | ................... | G01J 1/429 |
| 2023/0199928 A1* | 6/2023 | Lee | ....................... | H05B 45/37 |
| | | | | 315/313 |

FOREIGN PATENT DOCUMENTS

| | | | | | |
|---|---|---|---|---|---|
| ES | 2666995 | T3 | * | 5/2018 | ............... A61N 5/06 |
| ES | 2934308 | T3 | * | 2/2023 | ............... F21K 9/00 |
| JP | 2022022371 | A | * | 2/2022 | |
| WO | WO-2012176869 | A1 | * | 12/2012 | ......... H05B 33/0818 |

* cited by examiner

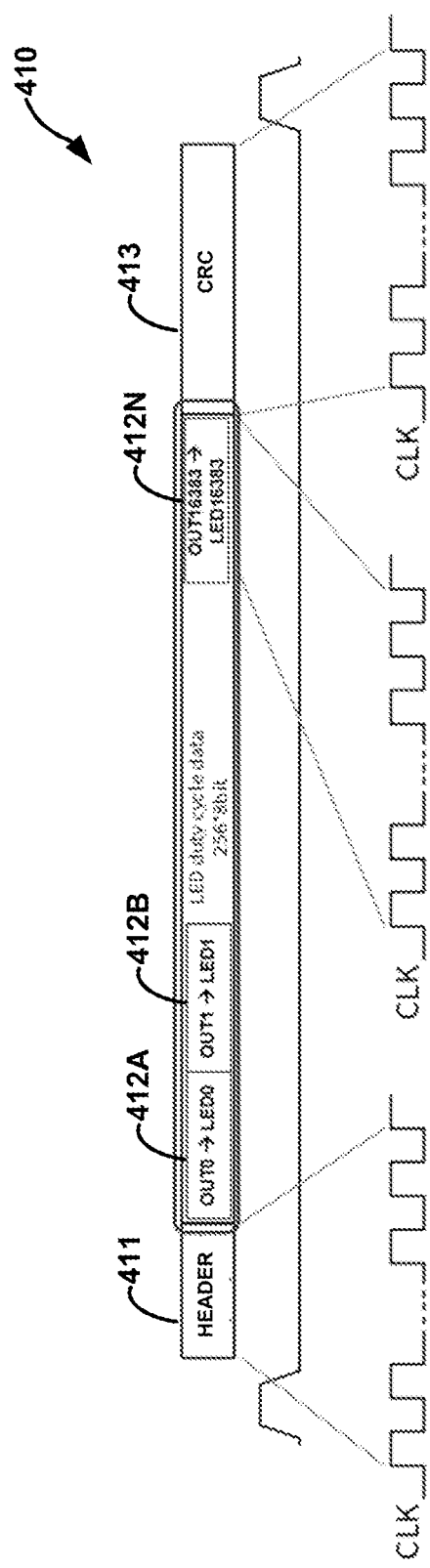
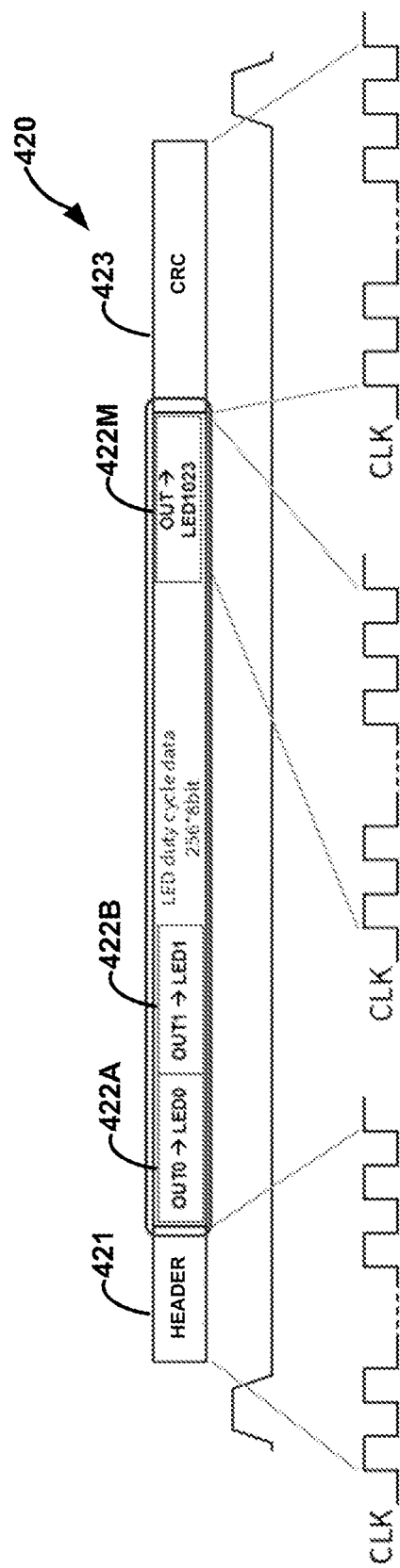
FIG. 4A
FIG. 4B

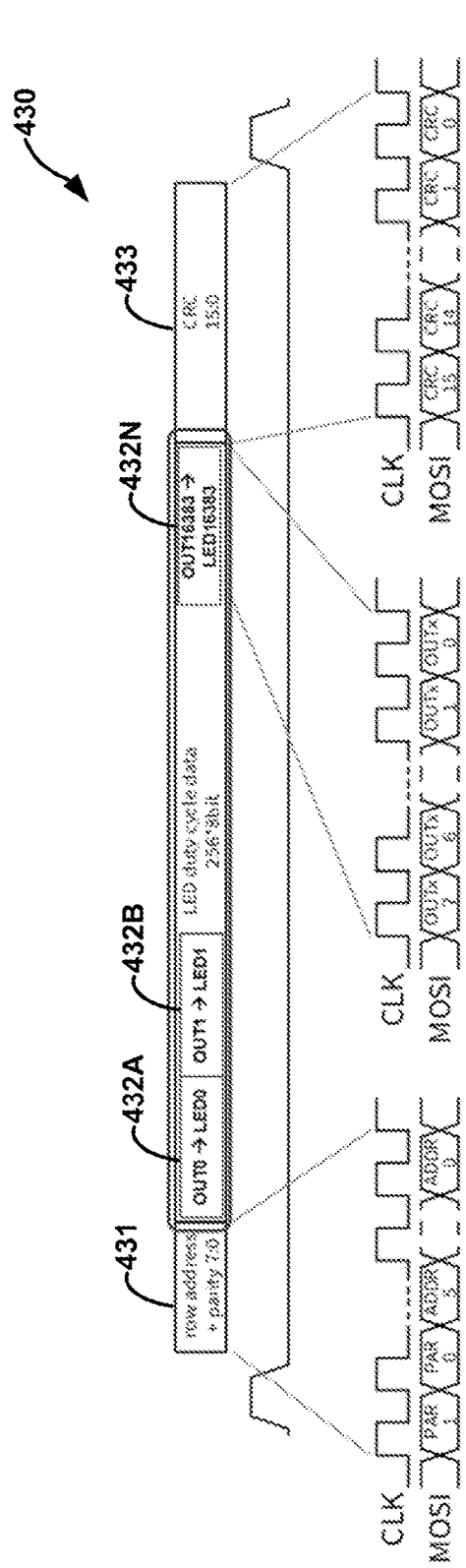
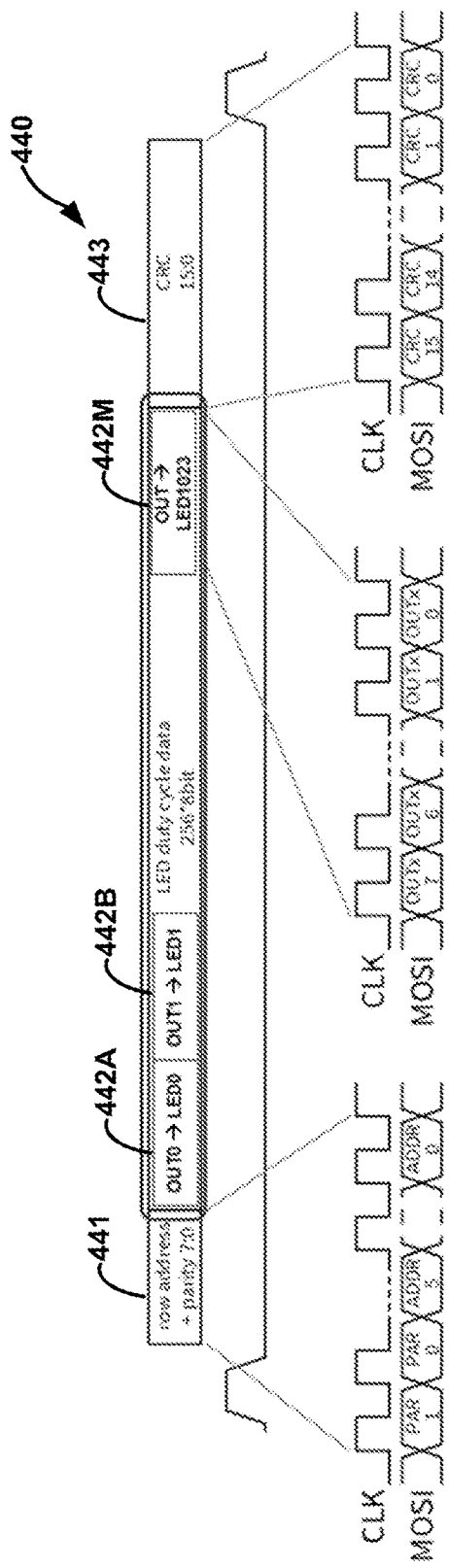
FIG. 4C
FIG. 4D

SYSTEM FOR INDIVIDUALLY CONTROLLING LIGHT-EMITTING DIODES (LEDS) AND CONTROLLING CLUSTERS OF LEDS AS UNITS

TECHNICAL FIELD

This disclosure relates circuits for driving, controlling, and monitoring light-emitting diodes in vehicles or other settings.

BACKGROUND

Driver circuits are often used to control a voltage, current, or power at a load. For instance, a controller may manage the power supplied to a set of light-emitting diodes (LEDs). In some cases, the set of LEDs may be placed in a formation. The controller may be configured to control the set of LEDs so that the formation conveys an output. For example, the controller may control whether each LED of the set of LEDs placed in the formation is turned on or turned off. The output conveyed by the set of LEDs placed in the formation may depend on how each LED of the set of LEDs are placed in the formation, and whether each LED of the set of LEDs is turned on or turned off.

Some LED circuits include a large number of individually controllable LEDs arranged in a two-dimensional matrix. The individually controllable LEDs can be driven so as to provide different lighting (e.g., high beam, low beam lighting, rear lighting, interior lighting) for different driving conditions, or to provide advanced lighting effects. Advanced vehicle headlamp systems, for example, are one example application of such LED circuits, whereby lighting effects associated with vehicle operation can be used to improve the driving experience and to promote vehicle safety.

SUMMARY

In general, this disclosure is directed to devices, systems, and techniques for controlling an output of a set of light-emitting diodes (LEDs) according to one or more LED control modes. For example, a controller may be configured to manage the output of the set of LEDs. The controller may use computing resources to manage an output of each LED of the set of LEDs. The controller may use a greater amount of computing resources to individually control the output of each LED of the set of LEDs as compared with an amount of computing resources that the controller uses to control clusters of LEDs to emit the same output. This is because to individually control the set of LEDs at a granular level, the controller may output a high number of instructions and perform computations at a high rate. When the controller manages clusters of LEDs to emit the same output, the controller may output fewer instructions and perform computations at a lower rate as compared with when the controller individually controls each LED.

The set of LEDs may be arranged in a formation so that each LED of the set of LEDs occupies a location within the formation. In some examples, the controller may cause the set of LEDs to output a message via the light that is emitted by the LEDs. The message may include one or more symbols, letters, numbers, or any combination thereof. The message output by the set of LEDs may depend on the output of each LED of the set of LEDs and the location of each LED of the set of LEDs within the formation. For example, the controller may cause the set of LEDs to output a message including an arrow by turning on one or more LEDs of the set of LEDs based on the location of the one or more LEDs in the formation so that the one or more LEDs form the shape of an arrow.

To cause the set of LEDs to output high-resolution, complex messages via the light that is emitted by the LEDs, it may be beneficial for the controller to individually control each LED of the set of LEDs. This is because when the set of LEDs are arranged in a matrix, a grid, or any other kind of formation where LEDs are close to other LEDs, each LED of the set of LEDs may represent an individual pixel. To achieve the highest possible resolution, the controller may individually control the output each LED of the set of LEDs. In some cases, the controller may be configured cause the set of LEDs to output a low-resolution message that does not require individual control of each LED. For example, the controller may be configured to cause the set of LEDs to output a symbol by turning on one or more clusters of LEDs that form the symbol.

The controller may be configured to control the set of LEDs according to a first LED control mode and a second LED control mode. The first LED control mode may cause the controller to use a first amount of computing resources, and the second LED control mode may cause the controller to use a second amount of computing resources that is lower than the first amount of computing resources. The first LED control mode may allow the controller to individually control each LED of the set of LEDs to produce a high-resolution output. In some examples, the second LED control mode may allow the controller to control each LED cluster of one or more clusters of LEDs to produce a low-resolution output, but the second LED control mode is not limited to producing low-resolution outputs. One or more LED clusters of set of LED clusters may, in some cases, include high-resolution shapes. This may allow the controller to activate a high-resolution LED cluster according to the second LED control mode.

The techniques of this disclosure may provide one or more advantages. Since the controller is configured to use both a first LED control mode that requires a high amount of computing resources and a second LED control mode that requires a low amount of computing resources, the controller may be configured to use the first LED control mode to cause the LEDs to output high-resolution messages when necessary. The controller also may conserve computing resources by using the second LED control mode to control each LED cluster of a set of LED clusters as a unit. Sometimes, the controller may cause the LEDs to output low-resolution messages when using the second LED control mode, but the second control mode is not limited to producing low-resolution messages. The controller may use the second LED control mode go produce high-resolution messages when one or more LED clusters form high-resolution symbols. This means that the controller may be configured to control LEDs to output a greater variety of messages and conserve a greater amount of computing resources as compared with controllers that are not configured for both a first LED control mode that uses a high amount of computing resources and a second LED control mode that uses a low amount of computing resources.

In some examples, a system includes an LED circuit comprising a set of LEDs arranged in a formation, wherein the set of LEDs comprise a set of LED clusters, each LED cluster of the set of LED clusters comprising one or more LEDs of the set of LEDs, and a controller. The controller is configured to: control, according to a first LED control mode via a first interface between the LED circuit and the controller, whether each LED of the set of LEDs is turned on or turned off; and control, according to a second LED control mode via a second interface between the LED circuit and the controller, whether each LED cluster of the set of LED clusters is turned on or turned off, wherein the first LED control mode requires the controller to use a first amount of computing resources, wherein the second LED control mode requires the controller to use a second amount of computing resources, and wherein the second amount of computing resources is lower than the first amount of computing resources.

In some examples, a method includes controlling, by a controller according to a first LED control mode via a first interface between an LED circuit and the controller, whether each LED of a set of LEDs is turned on or turned off, wherein an LED circuit comprises the set of LEDs arranged in a formation, and wherein the set of LEDs comprise a set of LED clusters, each LED cluster of the set of LED clusters comprising one or more LEDs of the set of LEDs; and controlling, by the controller according to a second LED control mode via a second interface between the LED circuit and the controller, whether each LED cluster of the set of LED clusters is turned on or turned off, wherein the first LED control mode requires the controller to use a first amount of computing resources, wherein the second LED control mode requires the controller to use a second amount of computing resources, and wherein the second amount of computing resources is lower than the first amount of computing resources.

In some examples, a controller is configured to: control, according to a first LED control mode via a first interface between an LED circuit and the controller, whether each LED of a set of LEDs is turned on or turned off, wherein an LED circuit comprises the set of LEDs arranged in a formation, wherein the set of LEDs comprise a set of LED clusters, each LED cluster of the set of LED clusters comprising one or more LEDs of the set of LEDs; and control, according to a second LED control mode via a second interface between the LED circuit and the controller, whether each LED cluster of the set of LED clusters is turned on or turned off, wherein the first LED control mode requires the controller to use a first amount of computing resources, wherein the second LED control mode requires the controller to use a second amount of computing resources, and wherein the second amount of computing resources is lower than the first amount of computing resources.

The summary is intended to provide an overview of the subject matter described in this disclosure. It is not intended to provide an exclusive or exhaustive explanation of the systems, devices, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF THE DRAWINGS

FIGS. 4A-4D are conceptual diagrams illustrating a difference between an amount of data for individually controlling each LED of a set of LEDs and an amount of data for controlling each LED cluster of a set of LED clusters as a unit, in accordance with one or more techniques of this disclosure.

DETAILED DESCRIPTION

Figure 1A:
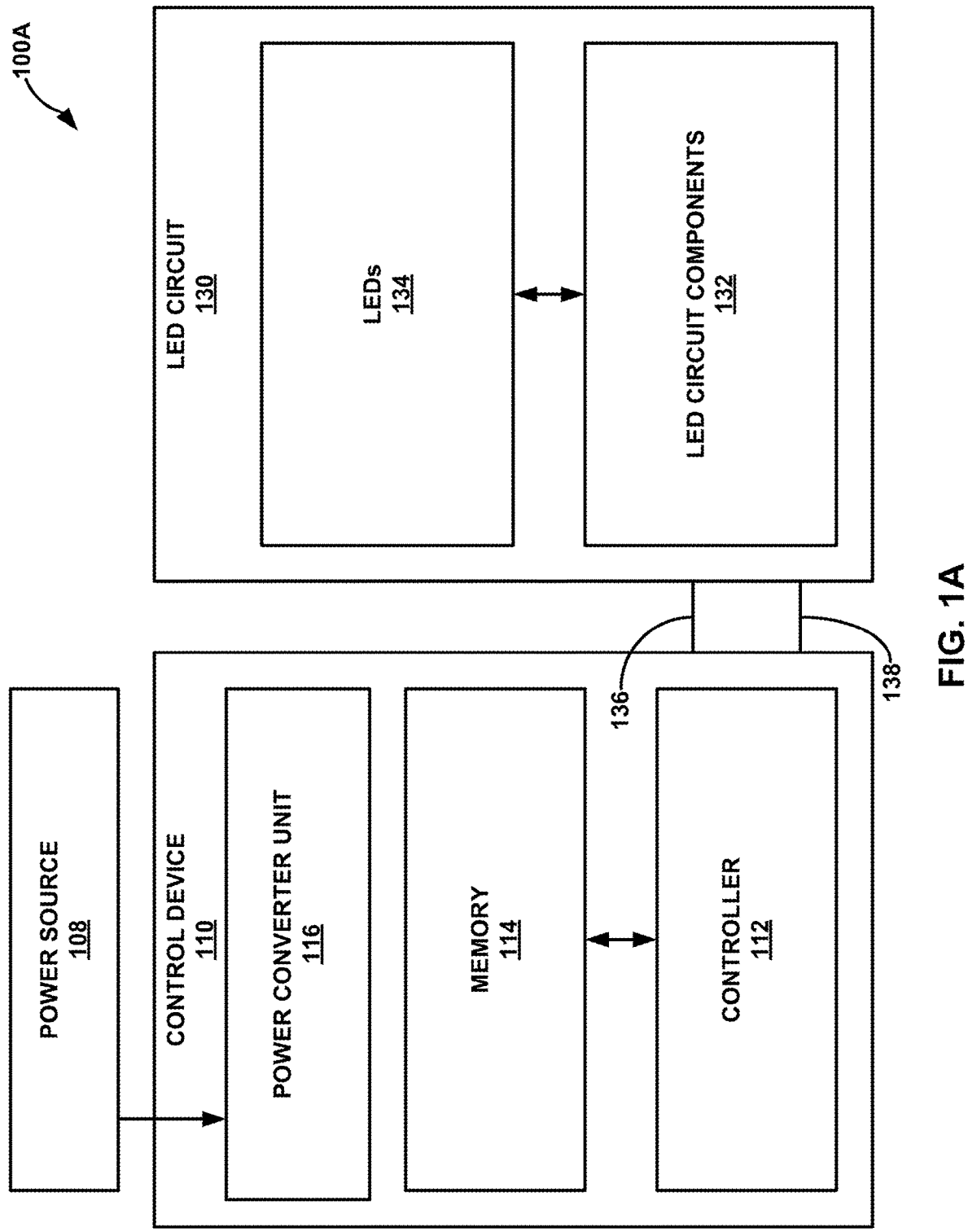
FIG. 1A is a block diagram illustrating a first system for controlling an output from one or more light-emitting diodes (LEDs), in accordance with one or more techniques of this disclosure.

FIG. 1A is a block diagram illustrating a first system 100A for controlling an output from one or more light-emitting diodes (LEDs), in accordance with one or more techniques of this disclosure. As seen in FIG. 1A, first system 100A includes power source 108, control device 110, and LED circuit 130. Control device 110 includes controller 112, memory 114, and power converter unit 116 and LED circuit 130 includes LED circuit components 132 and LEDs 134. First interface 136 and second interface 138 may connect control device 110 and LED circuit 130.

Power source 108 may supply electrical energy to control device 110. In some examples, power source 108 includes a battery and a power generation circuit to produce operating power. In some examples, power source 108 is rechargeable to allow extended operation. Power source 108 may include any one or more of a plurality of different battery types, such as nickel cadmium batteries and lithium ion batteries. In some examples, a maximum voltage output of power source 108 is approximately 12V. In some examples, power source 108 supplies power within a range from 10 Watts (W) to 15 W. In some examples, power source 108 represents a power source other than a battery.

Control device 110 may be configured to control an output from a set of LEDs using one or more LED control modes. For example, control device 110 may be configured to use a first LED control mode that uses a first amount of computing resources and a second LED control mode that uses a second amount of computing resources that is lower than the first amount of computing resources. Control device 110 may use the first LED control mode to cause the set of LEDs to output a high-resolution message via the light that is emitted by the LEDs, and control device 110 may use the second LED control mode to cause the set of LEDs to output a low-resolution message. Control device 110 may consume fewer computing resources when using the first LED control mode as compared with when control device 110 uses the second LED control mode. This allows control device 110 to control the LEDs to output a high-resolution message when necessary and save computing resources when it is not necessary for the LEDs to output a high-resolution message.

Controller 112 of control device 110 may include processing circuitry. The processing circuitry may include, for example, one or more microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the processing circuitry of controller 112 may include any suitable structure, whether in hardware, software, firmware, or any combination thereof, to perform the functions ascribed herein to control device 110.

Control device 110 may include a memory 114 in communication with the controller 112 of control device 110. In some examples, the memory 114 in communication with the controller 112 includes computer-readable instructions that, when executed by the controller 112, cause first system 100A to perform various functions attributed to first system 100A herein. The memory 114 may include any volatile, non-volatile, magnetic, optical, or electrical media, such as a random access memory (RAM), read-only memory (ROM), non-volatile RAM (NVRAM), electrically erasable programmable ROM (EEPROM), flash memory, or any other digital media capable of storing information.

Power converter unit 116 of control device 110 may receive an electrical signal from power source 108. In some cases, power converter unit 116 includes a direct current-to-direct current (DC-to-DC) power converter configured to regulate one or more electrical signals output by power converter unit 116, but this is not required. In some examples, power converter unit 116 includes a direct current-to-alternating current (DC-to-AC) power converter, an alternating current-to-direct current (AC-to-DC) power converter, or an alternating current-to-alternating current (AC-to-AC) power converter. Power converter unit 116 is not limited to including only one power converter. Power converter unit 116 may include more than one power converter.

Power converter unit 116 may include one or more buck converters, boost converters, buck-boost converters, or any combination thereof. For example, power converter unit 116 may include a boost converter connected to a set of buck converters, a buck converter connected to a set of boost converters, or any other arrangement of buck converters, boost converters, and buck-boost converters. In some examples, a buck converter is configured to step down voltage and step up current from the electrical signal received by the buck converter. A boost converter may be configured to may step up voltage and step down current from the electrical signal received by the boost converter. A buck-boost converter may be configured to toggle between a buck mode and a boost mode, where the buck-boost converter behaves like a buck converter in the buck mode and behaves like a boost converter in the boost mode.

In some examples, LED circuit 130 may include LEDs 134 as well as LED circuit components 132. In some examples, LED circuit components 132 include processing circuitry, memory, or any other kind of components of LED circuit 130. In some examples, control device 110 is configured to control one or more of LED circuit components 132. LED circuit components 132 may be configured to communicate with LEDs 134. For example, LED circuit components 132 may be configured to control LEDs 134. Control device 110 may be configured to control LEDs 134 via LED circuit components 132, but this is not required. In some examples, control device 110 controls LEDs 134 without using LED circuit components 132.

In some examples, LEDs 134 include any one or more suitable semiconductor light sources. In some examples, each LED of LEDs 134 may include a p-n junction configured to emit light when activated. In some examples, LEDs 142 are included in a headlight assembly for automotive applications. For instance, LEDs 134 may include a matrix, a string, a plurality of strings of light-emitting diodes, or another set or arrangement of LEDs to light a road ahead of a vehicle. As used herein, a vehicle may refer to motorcycles, trucks, boats, golf carts, snowmobiles, heavy machines, or any type of vehicle that uses directional lighting. In some examples, LEDs 134 include any kind of LED, including front automotive LEDs, interior automobile LEDs, rear automotive LEDs, or any combination thereof. LEDs 134 may include any number of LEDs. In some examples, LEDs 134 include a number of LEDs within a range from 10 LEDs to 100,000 LEDs. In some examples, LEDs 134 may include a number of LEDs within a range from 10,000 LEDs to 20,000 LEDs.

LEDs 134 may be placed in a two-dimensional (2D) formation. That is, each LED of LEDs 134 may be placed in a location within a 2D space. In some examples, the 2D formation comprises a matrix having a number of columns of LEDs and a number of rows of LEDs. In some examples, the 2D formation comprises a number of overlapping rows. In some examples, the 2D formation comprises a number of overlapping columns. In any case, the 2D formation of LEDs 134 may be configured so that LEDs 134 may output information including one or more letters, one or more numbers, one or more symbols, or any combination thereof. The information output by LEDs 134 may determine whether each LED of LEDs 134 is turned on or turned off, a location of each LED of LEDs 134 within the 2D formation, a color of light emitted by each LED of LEDs 134, an intensity of light emitted by each LED of LEDs 134, or any combination thereof.

In some examples, each LED of LEDs 134 represents a micro-LED (µLED). LEDs 134 may be placed on a single LED driver ASIC in a grid formation such that each µLED on the grid represents an individual pixel on the grid. The grid of LEDs may output information by activating pixels on the grid to form one or more shapes. In some examples each LED of LEDs 134 has a width within a range that extends from 40 micrometers (µm) to 120 µm. In some examples, each LED of LEDs 134 has a width of 80 µm. In some examples, each LED of LEDs 134 has a height within a range that extends from 40 µm. to 120 µm. In some examples, each LED of LEDs 134 has a height of 80 µm.

Controller 112 may control LEDs 134 to output information. In some examples, to control LEDs 134, controller 112 manages, according to a first LED control mode via first interface 136 between the LED circuit 130 and the controller 112, each LED of LEDs 134 individually and independent from each other LED of LEDs 134. For example, controller 112 may control an output of a first LED of LEDs 134, controller 112 may control an output of a second LED of LEDs 134, controller 112 may control an output of a third LED of LEDs 134, and so on. When controller 112 controls the output of the first LED, controller 112 controls the output independently from controlling the output of each other LED of LEDs 134. When controller 112 controls the output of the second LED, controller 112 controls the output independently from controlling the output of each other LED of LEDs 134. When controller 112 controls the output of the third LED, controller 112 controls the output independently from controlling the output of each other LED of LEDs 134. When using the first LED control mode, controller 112 controls the output of each LED independently such that LEDs 1354 output the information.

In some examples, using the first LED control mode via first interface 136 to control LEDs 134 allows the controller 112 to control the LEDs 134 to output a high-resolution message via the light that is emitted by the LEDs. The term "resolution" describes a level of granularity that the formation of LEDs 134 presents a message. For example, a high-resolution message may include more detail than a low-resolution message, because controller 112 individually controls LEDs 134 to produce a high-resolution message. In some examples, a low-resolution message has a lower level of granularity and less detail than a high-resolution message, because controller controls groups of LEDs 134 instead of individually controlling each LED of LEDs 134.

To control each LED of LEDs 134 according to the first LED control protocol, controller 112 may control whether each LED of LEDs 134 is turned on or turned off. In some examples, to control each LED of LEDs 134 according to the first LED control protocol, controller 112 controls an intensity of light emitted by each LED of LEDs 134. For example, controller 112 may control a duty cycle of each LED of LEDs 134. A duty cycle of an LED may determine an amount of light emitted by the LED. As referred to herein, "duty cycle" may refer to a ratio of time that an LED is turned on as compared to turned off. For example, when a duty cycle of an LED is 0.7, the LED may alternate between on phases and off phases, where on phases constitute 70% of the total time and off phases constitute 30% of the total time. In some examples, an LED emits a greater amount or intensity of light when the duty cycle of the LED is greater as compared to when the duty cycle of the corresponding current sink device is lower. In some examples, to control each LED of LEDs 134 according to the first LED control protocol, controller 112 controls a color of light emitted by each LED of LEDs 134.

The first interface 136 between LED circuit 130 and control device 110 may represent a "fast" interface that supports a high volume or rate of communication between LED circuit 130 and control device 110 so that controller 112 may individually control each LED of LEDs 134. For example, the first interface 136 may comprise a virtual universal asynchronous receiver transmitter (vUART), a serial peripheral interface (SPI), or another kind of fast interface. When granular control of LEDs 134 is necessary, LED circuit 130 may connect to control device 110 via first interface 136 which supports that the high volume or rate of communication between LED circuit 130 and control device 110 for individually controlling each LED of LEDs 134.

In some examples, LEDs 134 include a set of LED clusters. Each LED cluster of the set of LED clusters may include a group of LEDs of LEDs 134. In some cases, each LED cluster of the set of LED clusters may include a number of LEDs that is equal to the number of LEDs of each other LED cluster of the set of LED clusters. In some examples, at least one LED cluster of the set of LED clusters includes a number of LEDs that is different from a number of LEDs of at least one other LED cluster of the set of LED clusters. Each LED cluster of the set of LED clusters may include two or more LEDs of LEDs 134, but this is not required. At least one LED cluster may, in some cases, include a single LED.

Controller 112 may be configured to control, according to a second LED control mode via a second interface 138 between the LED circuit 130 and the controller 112, each LED cluster of the set of LED clusters of LEDs 134. When using the second LED control mode, controller 112 may be configured to control each LED cluster of the set of LED clusters as a unit so that each LED of the respective LED cluster emits the same output of each other LED of the respective cluster. In other words, when controller 112 uses the second LED control mode to control each LED cluster of the set of LED clusters, the output from LEDs 134 depends on the LEDs of each LED cluster of the set of LED clusters emitting the same output. This means that a granularity of an output from LEDs 134 according to the second LED control mode might be lower than a granularity of an output from LEDs 134 according to the first LED control mode. This is because the first LED control mode allows the controller 112 to control the output of each LED of LEDs 134, whereas controller 112 might not be able to control the output of one or more individual LEDs according to the second LED control mode.

The second interface 138 between LED circuit 130 and control device 110 may represent a "slow" interface that supports a low volume or rate of communication between LED circuit 130 and control device 110. Although the second interface 138 does not support as high a volume or rate of communication as first interface 136 supports, the second interface 138 may support a volume or rate of communication that is fast enough for controlling each LED cluster of the set of LED clusters as a unit. For example, the second interface 138 may comprise a slow universal asynchronous receiver transmitter (UART) over controller area network (CAN), a slow inter-integrated circuit (I2C), a slow CAN, or another kind of fast interface. When granular control of LEDs 134 is not necessary, LED circuit 130 may connect to control device 110 via second interface 138 which supports the volume or rate of communication between LED circuit 130 and control device 110 for controlling each LED cluster of the set of LED clusters, while conserving computing resources of controller 112. In some examples, second interface 138 may be a slow interface because a highest rate of communication supported by second interface 138 is lower than a highest rate of communication supported by first interface 136, which is a fast interface.

In some examples, the first LED control mode that allows controller 112 to individually control the output of each LED of LEDs 134 requires a greater amount of computing resources from controller 112 as compared with the second LED control mode that allows controller 112 to control each LED cluster of the set of LED clusters as a unit. For example, individually controlling each LED of LEDs 134 may require controller 112 to perform a greater number and/or a greater rate of computing actions as compared with controlling clusters of LEDs. This is because controlling a cluster of more than one LED to each emit the same output may require substantially the same amount of computing resources from controller 112 as individually controlling a single LED to emit an output.

In some examples, to control each LED cluster of the set of LED clusters of LEDs 134 according to the second LED control mode, controller 112 controls whether each LED cluster of the set of LED clusters is turned on or turned off. In some examples, to control whether each LED cluster of the set of LED clusters is turned on or turned off, controller 112 is configured to control the set of LED clusters so that for each LED cluster of the LED clusters, every LED of the respective LED cluster is turned on or turned off. In some examples, to control each LED cluster of the set of LED clusters of LEDs 134 according to the second LED control mode, controller 112 controls an intensity of light emitted by each LED cluster of the set of LED clusters. To control the intensity of light emitted by each LED cluster of the set of LED clusters, controller 112 is configured to control the set of LED clusters so that for each LED cluster of the LED clusters, every LED of the respective LED cluster is configured to emit the same intensity of light. Controller 112 may control intensity of light by controlling duty cycle In some examples, to control each LED cluster of the set of LED clusters of LEDs 134 according to the second LED control mode, controller 112 controls a color of light emitted by each LED cluster of the set of LED clusters. To control the color of light emitted by each LED cluster of the set of LED clusters, controller 112 is configured to control the set of LED clusters so that for each LED cluster of the LED clusters, every LED of the respective LED cluster is configured to emit the same color of light. Controller 112 is not limited to controlling whether LEDs 134 are turned on or turned off, controlling an intensity of light emitted by LEDs 134, and controlling a color of light emitted by LEDs 134. Controller 112 may control one or more other aspects of an output from LEDs 134.

Memory 114 and/or a memory of LED circuit 130 may be configured to store an animation sequence. The animation sequence may define each LED cluster of the set of LED clusters of LEDs 134. For example, the animation sequence may include information indicating one or more LEDs of LEDs 134 corresponding to each LED cluster of the set of LED clusters. To control whether each LED cluster of the set of LED clusters is turned on or turned off, the controller 112 is configured to receive information indicating a desired output of LEDs 134. Controller 112 may control, based on the information indicating the desired output, the set of LED clusters based on the animation sequence to cause LEDs 134 to output the desired output.

In some examples, LEDs 134 are arranged in a formation. The formation may include a grid of LEDs having a set of rows of LEDs and a set of columns of LEDs. In some examples, each LED cluster of the set of LED clusters comprises a rectangular cluster including a first dimension of m LEDs and a second dimension of n LEDs. In some examples, each rectangular LED cluster of the set of rectangular LED clusters represents a square cluster where the first dimension of m LEDs and the second dimension of n LEDs includes the same number of LEDs. In some examples, for each LED cluster of the set of LED clusters, the first dimension of m LEDs and the second dimension of n LEDs includes different numbers of LEDs.

The set of LED clusters may be arranged on the grid of LEDs 134 so that the LED clusters comprise a set of rows of LED clusters and a set of columns of LED clusters. For example, when each LED cluster of the set of LED clusters comprises a 4×4 square cluster of LEDs, a first LED cluster may occupy four rows and four columns of the grid of LEDs 134, a second LED cluster directly below the first LED cluster may occupy the same four columns of LEDs and four additional rows of LEDs below the four rows occupied by the first LED cluster.

To control the set of LED clusters to cause the set of LEDs 134 to output the desired output, controller 122 may be configured to control the set of LED clusters such that a first one or more LED clusters of the set of LED clusters that form one or more symbols of the desired output are turned on. The first one or more LED clusters that are turned on may form the one or more symbols of the desired output. Controller 122 may control the set of LED clusters such that a second one or more LED clusters of the set of LED clusters are turned off. In some examples, the second one or more LED clusters of the set of clusters may be turned off so that the one or more symbols formed by the first one or more clusters that are turned on are visible.

In some examples, the animation sequence stored by memory 114 and/or the memory of LED circuit 130 defines each LED cluster of the set of LED clusters to form a symbol on the grid of LEDs 134. In some examples, the symbol corresponding to at least one LED cluster of the set of LED clusters is different from a symbol corresponding to one or more other LED clusters of the set of LED clusters. The one or more symbols may include geometric shapes, combinations of geometric shapes, quadratic shapes, arrows, letters, numbers, or any combination thereof. The animation sequence may define the set of LED clusters to be arranged on the grid of LEDs 134 such that each LED cluster of the set of LED clusters borders one or more other LED clusters of the set of LED clusters.

To control the set of LED clusters to cause the set of LEDs 134 to output the desired output, controller 112 may control the set of LED clusters such that a first one or more LED clusters of the set of LED clusters that correspond to the one or more symbols of the desired output are turned on. For example, if the desired output includes an arrow, controller 112 may an LED cluster that forms the shape of an arrow to be turned on. In some examples, controller 112 manages the set of LED clusters such that a second one or more LED clusters of the set of LED clusters that include at least one LED bordering an LED of an LED cluster of the first one or more LED clusters are turned off. This may ensure that LED clusters that form shapes of the desired output are visible against other LED clusters that do not form the shapes of the desired output.

Figure 1B:
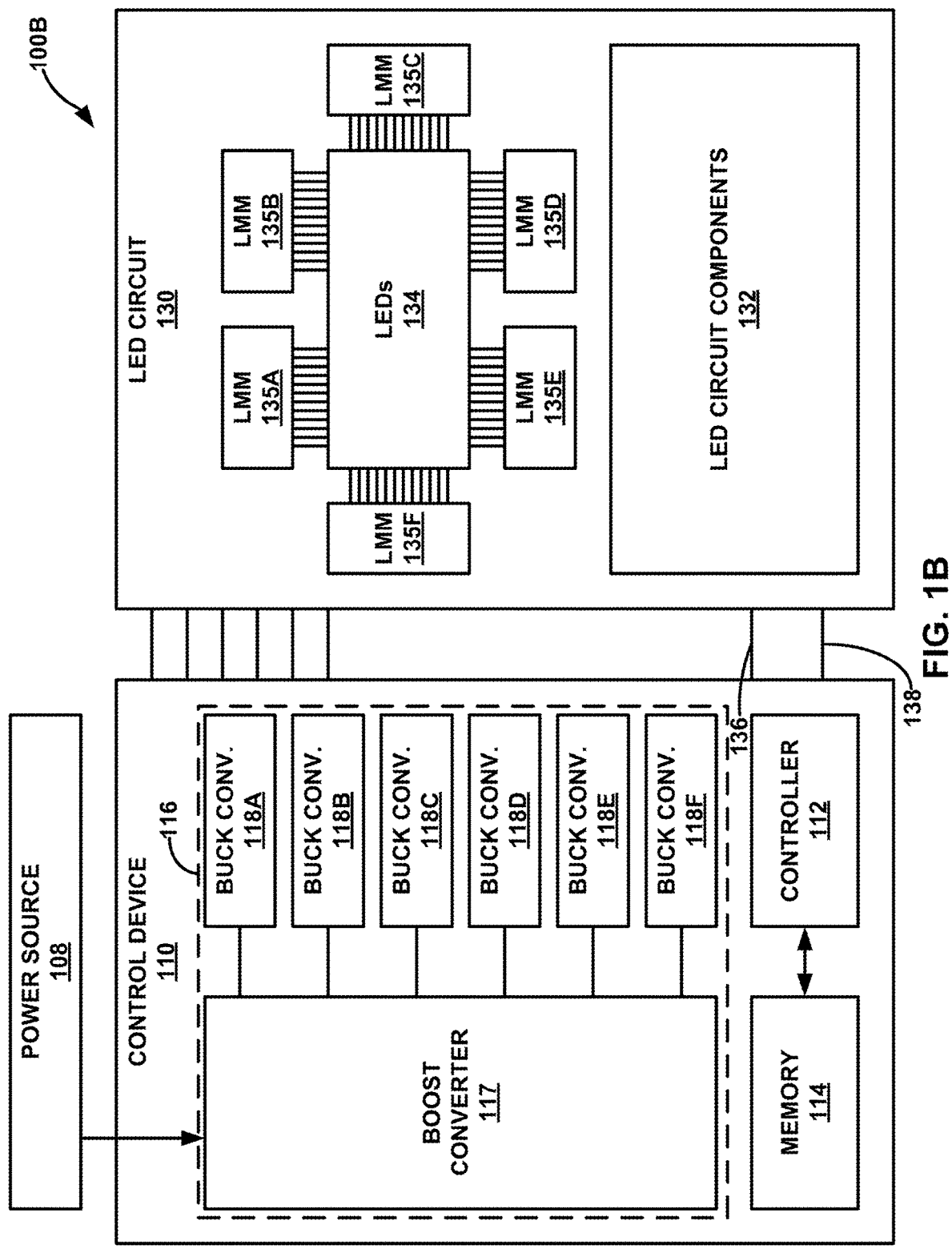
FIG. 1B illustrates is a block diagram illustrating a second system 100B for controlling an output from one or more LEDs, in accordance with one or more techniques of this disclosure.

FIG. 1B illustrates is a block diagram illustrating a second system 100B for controlling an output from one or more LEDs, in accordance with one or more techniques of this disclosure. In some examples, second system 100B is substantially the same as first system 100A except that second system 100B illustrates power converter unit 116 as including boost converter 117 and buck converters 118A-118F and second system 100B includes line matrix managers (LMMs) 135A-135F. In some examples, boost converter 117 receives an electrical signal from power source 108. Boost converter 117 may output, based on the electrical signal received from power source 108, an electrical signal to each buck converter 118 of buck converters 118.

In some examples, each buck converter of buck converters 118 corresponds to an LMM of LMMs 135. For example, buck converter 118A may correspond to LMM 135A, buck converter 118B may correspond to LMM 135B, buck converter 118C may correspond to LMM 135C, buck converter 118D may correspond to LMM 135D, buck converter 118E may correspond to LMM 135E, and buck converter 118F may correspond to LMM 135F. Each buck converter of buck converters 118 may supply power to the corresponding LMM of LMMs 135. Each LMM of LMMs 135 may correspond to one or more LEDs of LEDs 134. That is, each LMM of LMMs 135 may supply power to one or more LEDs of LEDs 134.

Figure 2:
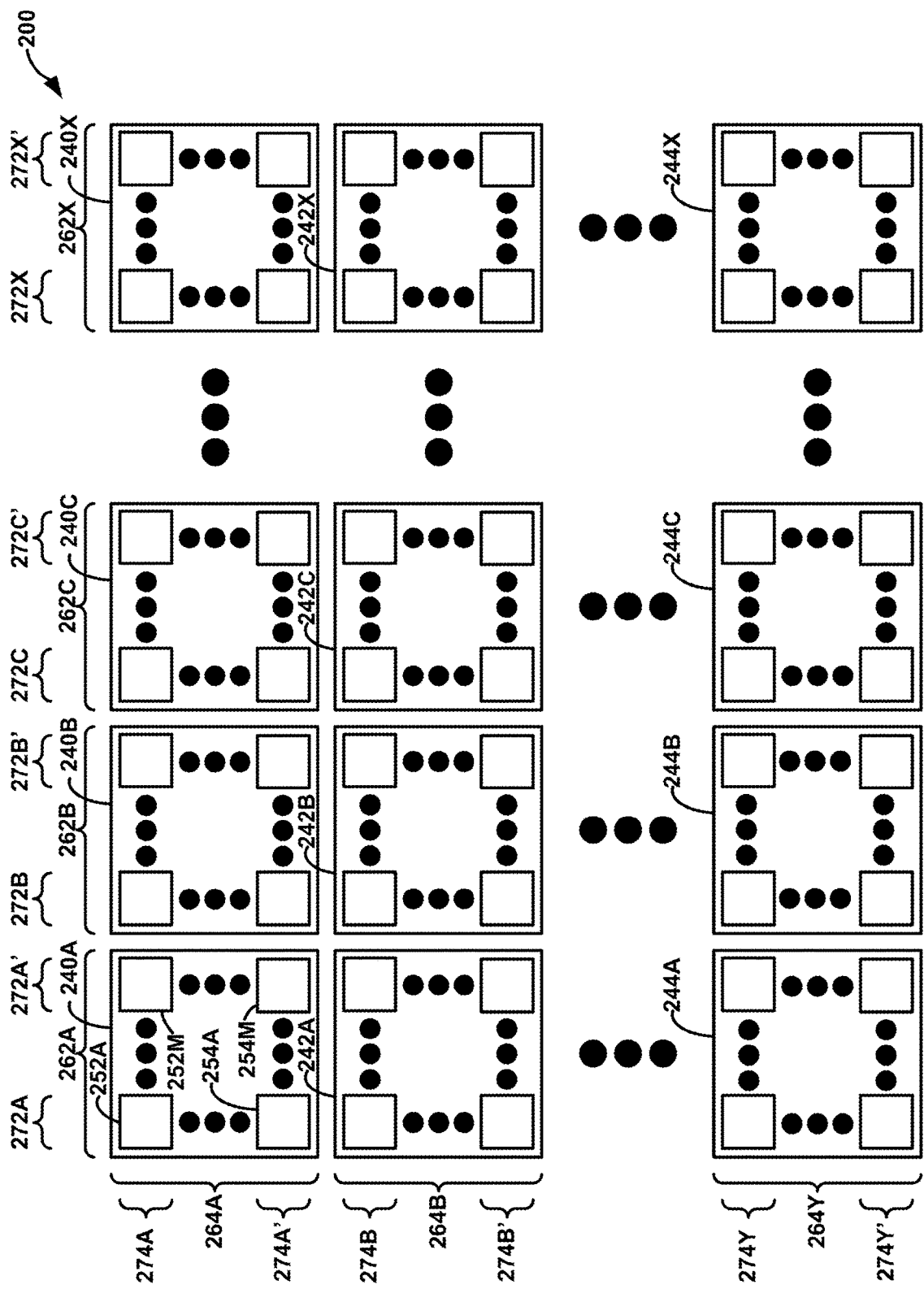
FIG. 2 is a conceptual diagram illustrating a formation of LEDs including a set of rectangular LED clusters, in accordance with one or more techniques of this disclosures.

FIG. 2 is a conceptual diagram illustrating a formation 200 of LEDs including a set of rectangular LED clusters, in accordance with one or more techniques of this disclosures. Formation 200 may represent a 2D formation of LEDs. LEDs placed within formation 200 may be examples of LEDs 134 of FIGS. 1A-1B. In some examples, formation 200 represents a grid formation of LEDs comprising a set of columns of LEDs and a set of rows of LEDs. Formation 200 may include a set of LED clusters, where each LED cluster of the set of LED clusters includes one or more LEDs. FIG. 2 may be described with respect to systems 100A-100B of FIGS. 1A-1B. However, the techniques of FIG. 2 may be performed by different components of systems 100A-100B or by additional or alternative systems.

For example, the formation 200 includes LED clusters 240A-240X (collectively, "LED clusters 240"), LED clusters 242A-242X (collectively, "LED clusters 242"), and LED clusters 244A-244X (collectively, "LED clusters 244") of a set of LED clusters. The set of LED clusters may form a set of LED cluster columns 262A-262X (collectively, "LED cluster columns 262") and a set of LED cluster rows 264A-264Y (collectively, "LED cluster rows 264"). Formation 200 may include any number of LED cluster columns 262 and any number of LED cluster rows 264. Although FIG. 2 only illustrates four LED cluster columns 262 and three LED cluster rows 264, formation 200 may include one or more LED cluster columns 262 and/or one or more LED cluster rows 264 not illustrated in FIG. 2. For example, there may be one or more LED cluster rows between LED cluster column 264C and LED cluster column 264X. Additionally, or alternatively, there may be one or more LED cluster rows between LED cluster row 264B and LED cluster row 264Y.

Each LED cluster of the set of LED clusters of formation 200 may include one or more LEDs and the LED clusters are arranged such that formation 200 includes a set of LED columns and a set of LED rows. For example, LED cluster 240A includes LED 252A-252M and LEDs 254A-254M. LED 252A corresponds to LED column 272A and LED row 274A, LED 252M corresponds to LED column 272A' and LED row 274A, LED 254A corresponds to LED column 272A and LED row 274A', and LED 254M corresponds to LED column 272A' and LED row 274A'. LED cluster 240A may include one or more LEDs not illustrated in FIG. 2. For example, there may be one or more LED columns between LED column 272A and LED column 272A'. Additionally, or alternatively, there may be one or more LED rows between LED row 274A and LED row 274A'.

Each LED cluster may correspond to one or more LED columns and one or more LED rows. For example, LED cluster 240A may correspond to LED columns 272A-272A' and LED rows 274A-274A', LED cluster 240B may correspond to LED columns 272B-272B' and LED rows 274A-274A', LED cluster 240C may correspond to LED columns 272C-272C' and LED rows 274A-274A', and so on. Additionally, LED cluster 240A may correspond to LED columns 272A-272A' and LED rows 274A-274A', LED cluster 242A may correspond to LED columns 272A-272A' and LED rows 274B-274B', and so on.

Controller 112 of FIGS. 1A-1B may be configured to individually control the LEDs of formation 200 via a first interface 136 according to a first LED control mode. That is, controller 112 may be configured to individually control each LED according to the first LED control mode without regard to which LED cluster the individual LED belongs to. As seen in FIG. 2A, the controller 112 may individually control each LED present within formation 200 in order to cause the LEDs to output a message. Since the LEDs are placed in a grid formation having a set of LED columns and a set of LED rows, controller 112 may be configured to individually control the LEDs of formation 200 via a first interface 136 at a granular level to cause the LEDs to output a high-resolution message.

The formation 200 may include thousands of LEDs. In some examples, the number of LED columns of formation 200 is within a range from 10 columns to 2,000 columns. In some examples, the number of LED rows of formation 200 are within a range from 10 rows to 2,000 rows. Since formation 200 may include a large number of LEDs and therefore a large number of pixels, controller 112 may cause the LEDs to output a high-resolution message indicating one or more numbers, letters, shapes, symbols, or any combination thereof by individually controlling an output of each LED present within formation 200.

Since formation 200 includes a large number of LEDs, controller 112 may use a large amount of computing resources to individually control each LED present within formation 200 at a granular level. This is because controller 112 must perform computations at a high rate to control an output of each LED of a large number of LEDs. First interface 136 comprises a fast interface so that the system is able to handle the high rate of computations necessary to individually control an output of each LED present within formation 200.

Controller 112 may perform computations at a lower rate in order to control each LED cluster of the set of LED clusters of formation 200 as a unit according to a second LED control mode instead of individually controlling each LED present within formation 200. In some examples, controller 112 manages the set of LED clusters according to the second LED control mode via a second interface 138. Second interface 138 may represent a slow interface that supports a lower rate of communication than first interface 136 supports. Controlling an LED cluster as a unit may involve controlling every LED within the LED cluster to generate the same output. For example, controller 112 may control every LED within LED cluster 242B to be turned on, control every LED within LED cluster 242B to have the same duty cycle, control every LED within LED cluster 242B to emit light of the same color, or any combination thereof.

Controller 112 may be configured to control one or more LED clusters of the set of LED clusters within formation 200 to control the set of LED clusters to output a low-resolution message indicating one or more numbers, letters, shapes, symbols, or any combination thereof. In some examples, the message output by the LEDs of formation 200 when controller 112 controls each LED cluster of the set of LED clusters within formation 200 has a lower resolution as compared with a message output by the LEDs of formation 200 when controller 112 individually controls each LED of the LEDs within formation 200. Since each LED cluster of the set of LEDs may include more than one LED, LED clusters are larger than individual LEDs. When LED clusters are controlled as a unit so that every LED within the cluster units the same output, this results in a resolution that is lower than when LEDs that are smaller than LED clusters are individually controlled.

Figure 3:
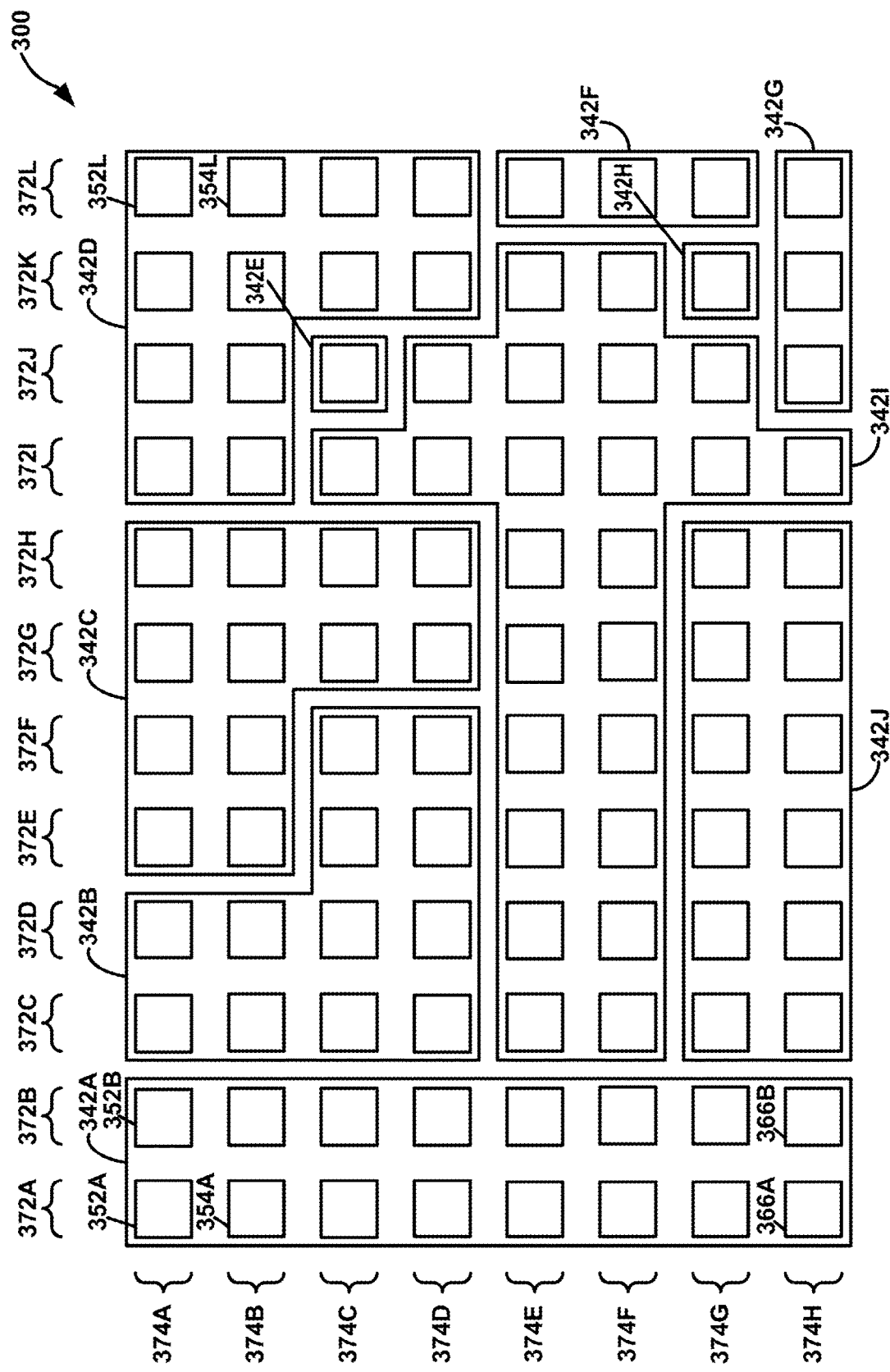
FIG. 3 is a conceptual diagram illustrating a formation of LEDs including a set of LED clusters that form one or more custom shapes, in accordance with one or more techniques of this disclosures.

FIG. 3 is a conceptual diagram illustrating a formation 300 of LEDs including a set of LED clusters 342A-342J that form one or more custom shapes, in accordance with one or more techniques of this disclosures. Formation 300 may represent a 2D formation of LEDs. LEDs placed within formation 300 may be examples of LEDs 134 of FIGS. 1A-1B. FIG. 3 may be described with respect to systems 100A-100B of FIGS. 1A-1B. However, the techniques of FIG. 3 may be performed by different components of systems 100A-100B or by additional or alternative systems.

In some examples, formation 300 represents a grid of LEDs comprising a set of LED columns 372A-372L (collectively, "LED columns 372") and a set of LED rows 374A-374H (collectively, "LED rows 374"). For example, LED column 372A includes LEDs 352A-366A, LED column 372B includes LEDs 352B-366B, and so on. LED row 374A may include LEDs 352A-352L, LED row 374B includes LEDs 354A-352L, and so on. In some examples, formation 300 includes one or more LED columns that are not illustrated in FIG. 3. For example, formation 300 may include one or more LED columns to the left of LED column 372A. Additionally, or alternatively, formation 300 may include one or more LED columns to the right of LED column 372L. In some examples, formation 300 includes one or more LED rows that are not illustrated in FIG. 3. For example, formation 300 may include one or more LED rows above LED row 374A. Additionally, or alternatively, formation 300 may include one or more LED rows below LED row 374H.

Controller 112 of FIGS. 1A-1B may be configured to individually control the LEDs of formation 300 via a first interface 136 according to a first LED control mode. That is, controller 112 may be configured to individually control each LED according to the first LED control mode without regard to which LED cluster of LED clusters 342A-342J (collectively, "LED clusters 342") that the individual LED belongs to. As seen in FIG. 3, the controller 112 may individually control each LED present within formation 300 in order to cause the LEDs to output a message. Since the LEDs are placed in a grid formation having a set of LED columns 372 and a set of LED rows 374, controller 112 may be configured to individually control the LEDs of formation 300 via a first interface 136 at a granular level to cause the LEDs to output a high-resolution message.

The formation 300 may include thousands of LEDs. In some examples, the number of LED columns of formation 300 are within a range from 10 columns to 2,000 columns (including one or more columns not illustrated in FIG. 3). In some examples, the number of LED rows of formation 300 are within a range from 10 rows to 2,000 rows including one or more columns not illustrated in FIG. 3). Since formation 300 may include a large number of LEDs and therefore a large number of pixels, controller 112 may cause the LEDs to output a high-resolution message indicating one or more numbers, letters, shapes, symbols, or any combination thereof by individually controlling an output of each LED present within formation 200.

Since formation 300 includes a large number of LEDs, controller 112 may use a large amount of computing resources to individually control each LED present within formation 300 at a granular level. This is because controller 112 must perform computations at a high rate to control an output of each LED of a large number of LEDs. First interface 136 comprises a fast interface so that the system is able to handle the high rate of computations necessary to individually control an output of each LED present within formation 200.

Controller 112 may use a lower amount of computing resources to control each LED cluster of LED clusters 342 as a unit as compared with the amount of computing resources that controller 112 uses to individually control each LED of formation 300. In some examples, each LED cluster of LED clusters 342 include one or more LEDs of the formation 300. In some examples, one or more LED clusters of LED clusters 342 include a shape that is different than one or more other LED clusters of LED clusters 342. For example, LED cluster 342B may form the shape of an "L," whereas LED cluster 342L forms the shape of a rectangle having a width of 6 LEDs and a height of 2 LEDs. In some examples, one or more LED clusters of LED clusters 342 include a shape that is the same as one or more other LED clusters of LED clusters 342. For example, LED cluster 342C has a shape that is the same as a shape of LED cluster 342D.

One or more LED clusters of LED clusters 342 may include a number of pixels that is different than a number of pixels of one or more other LED clusters of LED clusters 342. For example, LED cluster 342A includes 16 LEDs, and LED cluster 342G includes 3 LEDs. One or more LED clusters of LED clusters 342 may include a number of pixels that is that is the same as a number of pixels of one or more other LED clusters of LED clusters 342. For example, LED cluster 342B, LED cluster 342C, LED cluster 342D, LED cluster 342J each include 6 LEDs.

Controller 112 may perform computations at a lower rate in order to control each LED cluster of the set of LED clusters 342 of formation 300 as a unit according to a second LED control mode instead of individually controlling each LED present within formation 300. In some examples, controller 112 manages the set of LED clusters 342 according to the second LED control mode via a second interface 138. Second interface 138 may represent a slow interface that supports a lower rate of communication than first interface 136 supports. Controlling an LED cluster as a unit may involve controlling every LED within the LED cluster to generate the same output. For example, controller 112 may control every LED within LED cluster 342B to be turned on, control every LED within LED cluster 342B to have the same duty cycle, control every LED within LED cluster 342B to emit light of the same color, or any combination thereof.

In some examples, by including LED clusters 342 that include a variety of shapes and a variety of numbers of pixels, LED formation 300 allows controller 112 to output high-resolution symbols even when controller 112 controls set of LED clusters 342 according to the second LED control mode via a second interface 138. For example, LED cluster 342I may represent a high-resolution symbol that forms the shape of an arrow. The head of the arrow formed by cluster 342I includes some portions that are only one LED in width. The portion of LED cluster 342I corresponding to LED row 374C is only one pixel wide. Additionally, the portion of LED cluster 342I corresponding to LED row 374H is only one pixel wide. An upper portion of head of the arrow formed by cluster 342I narrows by one pixel from LED column 372I to LED column 372J and narrows by one pixel from LED column 372J to LED column 372K.

By controlling LED clusters that form detailed and high-resolution symbols, controller 112 may conserve computing resources while still controlling the LEDs of formation 300 to emit a high-resolution output. For example, when controller 112 individually controls the LEDs of formation 300 to output a symbol having the same shape as the shape of LED cluster 342I according to the first LED control mode via the first interface 136, controller may output specific instructions to each LED within the arrow shape to cause the respective LED to emit light and output specific instructions to each LED or more other LEDs that are not part of the arrow shape to not emit light. Outputting specific instructions to a large number of individual LEDs may cause controller 112 to use a large amount of computing resources. On the other hand, when controller 112 uses the second LED control mode to control each LED cluster of LED clusters 342 so that formation 300 outputs the arrow of LED cluster 342I, controller 112 may use fewer computing resources as compared with when controller 112 uses the first LED control mode to individually control LEDs to output the same shape.

In some examples an animation sequence stored in a memory of control device 110 and/or a memory of LED circuit 130 defines each LED cluster of LED clusters 342. In some examples, controller 112 updates the animation sequence in order to change a shape of one or more LED clusters of LED clusters 342. In this way, controller 112 may change the high-resolution custom shapes of LED clusters 342 to achieve a high-resolution output from formation 300 while conserving computing resources of controller 112.

FIGS. 4A-4D are conceptual diagrams illustrating a difference between an amount of data for individually controlling each LED of a set of LEDs and an amount of data for controlling each LED cluster of a set of LED clusters as a unit, in accordance with one or more techniques of this disclosure. FIG. 4A includes first LED control information 410 including header 411, individual LED control information 412A-412N (collectively, "individual LED control information 412"), and cyclic redundancy check (CRC) 413. FIG. 4B includes second LED control information 420 including header 421, LED cluster control information 422A-422M (collectively, "LED cluster control information 422"), and CRC 423. FIG. 4C includes third LED control information 430 including row address 431, individual LED control information 432A-432N (collectively, "individual LED control information 432"), and CRC 433. FIG. 4D includes fourth LED control information 440 including row address 441, individual LED control information 442A-442N (collectively, "individual LED control information 432"), and CRC 443. FIGS. 4A-4D may be described with respect to systems 100A-100B of FIGS. 1A-1B. However, the techniques of FIGS. 4A-4D may be performed by different components of systems 100A-100B or by additional or alternative systems.

First LED control information 410 of FIG. 4A may include a header 411. First LED control information 410 may include individual LED control information 412 for each LED of LEDs 134. In the example of FIG. 4A, LEDs 134 may include 16,384 LEDs. Controller 112 may output first LED control information 410 comprising individual LED control information 412 via first interface 136 to control LEDs 134 to achieve a desired output according to the first LED control mode. Individual LED control information 412 may include individual LED control information corresponding to each LED of the 16,384 LEDs. In other words, individual LED control information 412 includes 16,384 sets of individual LED control information. Each of the 16,384 sets of individual LED control information may control an output from an individual LED of the 16,384 LEDs. First LED control information 410 may include CRC 413.

In some examples, each set of individual LED control information of individual LED control information 412 includes a clock signal ("CLK") that defines a duty cycle for an individual LED of LEDs 134. In some examples, each set of individual LED control information of individual LED control information 412 that defines the duty cycle for an individual LED of LEDs 134 includes 8 bits of data. This means that in the example of FIG. 4A, individual LED control information 412 may include a total of 131,072 bits, or 8 bits for each of the 16,384 LEDs. When controller 112 sends control information 412 at a refresh frequency of 100 Hertz (Hz) a fast interface such as first interface 162 may be necessary to transmit the first LED control information 410 comprising individual LED control information 412. Controller 112 may need to commit a large amount of computing resources to generate individual LED control information 412 at the refresh rate, since individual LED control information 412 includes individual LED control information 412 for each LED of the individual LED of the 16,384 LEDs.

In some examples, the 16,384 LEDs are divided into 1,024 LED clusters, where each LED cluster of the 1,024 LED clusters includes 16 LEDs of the 16,384 LEDs. In some examples, each LED cluster of the 1,024 LED clusters represents a 4×4 cluster. Second control information 420 of FIG. 4B may include header 421. Second LED control information 420 of FIG. 4B may include LED cluster control information 422 for each LED cluster of the set of LED clusters of LEDs 134. As seen in FIG. 4B, LED cluster control information 422 includes 1024 sets of LED cluster control information, each set of LED cluster control information corresponding to an LED cluster of the 1,024 LED clusters. In some examples, each set of LED cluster control information of LED cluster control information 422 defines a duty cycle for every LED within the respective LED cluster. Second control information 420 may include CRC 423

In some examples, each set of LED cluster control information of LED cluster control information 422 includes 8 bits of data. This means that LED cluster control information 422 may include 8,192 bits, or 8 bits for each of the 1,024 LED clusters. This also means that LED cluster control information 422 includes a significantly smaller amount of data than individual LED control information 412 includes. Since each set of LED cluster control information of LED cluster control information 422 controls every LED within the respective LED cluster to have the same output, controller 112 may send one 8 bit set of data defining a duty cycle for every LED within a cluster instead of sending one 8 bit set of data defining a duty cycle for each individual LED to save computing resources.

In some examples, third LED control information 430 of FIG. 4C may be substantially the same as first LED control information 410 of FIG. 4A, except that third LED control information 430 includes row address 431 in place of a header and third LED control information 430 includes both a clock signal ("CLK") and a main out subnode in ("MOSI") signal whereas first LED control information 410 includes a CLK signal without including a MOSI signal. In some examples, fourth LED control information 440 of FIG. 4D may be substantially the same as second LED control information 420 of FIG. 4B, except that fourth LED control information 440 includes row address 441 in place of a header and fourth LED control information 440 includes both a CLK signal and a MOSI signal whereas second LED control information 420 includes a CLK signal without including a MOSI signal.

Figure 5:
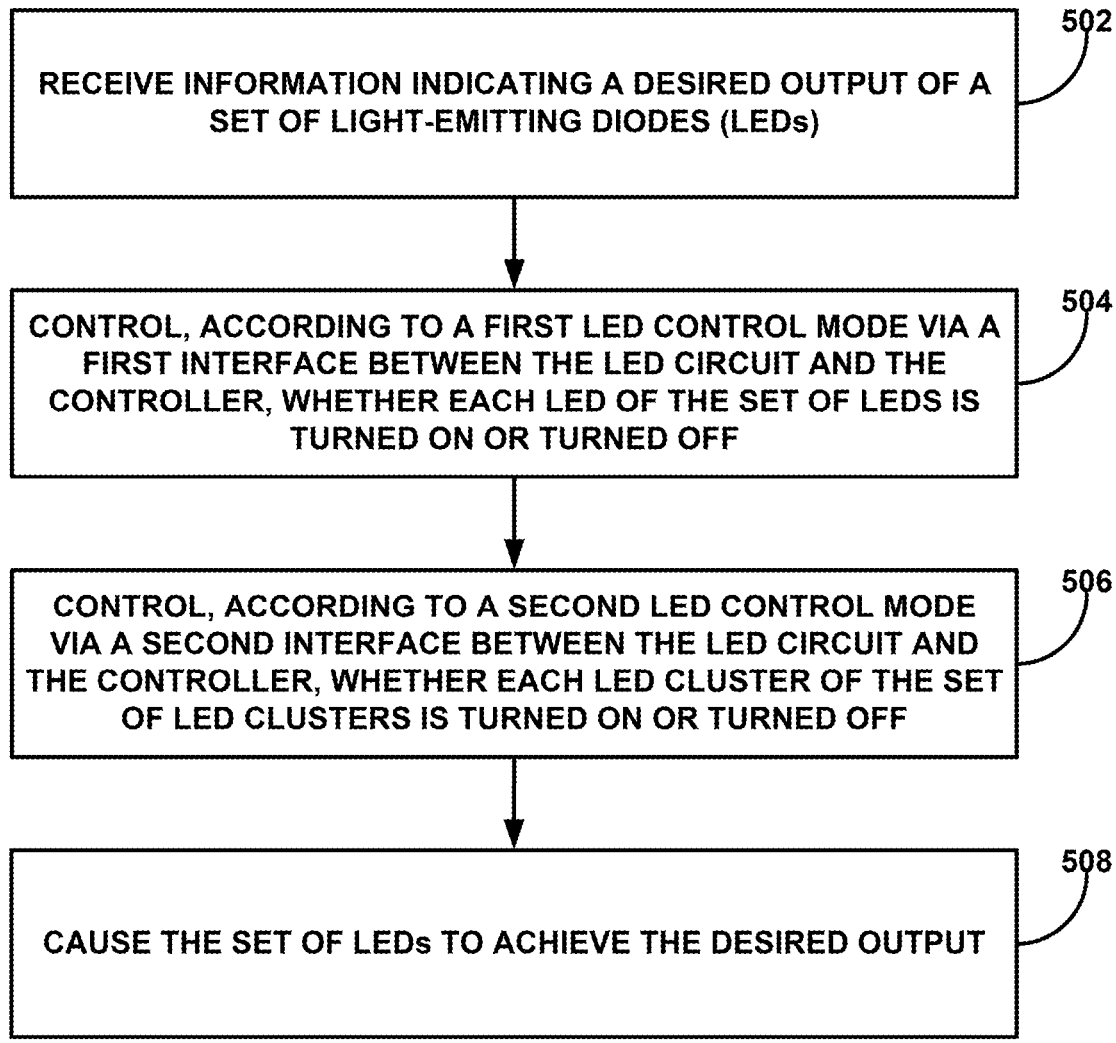
FIG. 5 is a flow diagram illustrating an example operation for controlling a set of LEDs to achieve a desired output, in accordance with one or more techniques of this disclosure.

FIG. 5 is a flow diagram illustrating an example operation for controlling a set of LEDs to achieve a desired output, in accordance with one or more techniques of this disclosure. FIG. 5 is described with respect to systems 100A-100B of FIGS. 1A-1B. However, the techniques of FIG. 5 may be performed by different components of systems 100A-100B or by additional or alternative systems.

Control device 110 may receive information indicating a desired output of a set of LEDs 134 (502). In some examples, the desired output may include information including one or more letters, numbers, symbols, or any combination thereof. The information of the desired output may convey a message. Control device 110 may be connected to an LED circuit 130 including LEDs 134 via a first interface 136 and a second interface 138. In some examples, the first interface 136 represents a fast interface and the second interface 138 represents a slow interface. That is, the first interface 136 may support a higher rate of communication than the second interface 138 supports.

Controller 122 may control, according to a first LED control mode via first interface 126 between LED circuit 130 and controller 122, whether each LED of the set of LEDs 134 is turned on or turned off (504). Individually controlling each LED of LEDs 134 may cause controller 112 to use a large amount of computing resources, because individually controlling each LED of LEDs 134 may require controller 122 to send a large number of instructions when there are a large number of LEDs 134. Individually controlling each LED of LEDs 134 may allow controller 112 to cause LEDs 134 to output a high-resolution message.

Controller 122 may control, according to a second LED control mode via a second interface 138 between the LED circuit 130 and the controller 112, whether each LED cluster of a set of LED clusters of LEDs 134 is turned on or turned off (506). Controlling each LED cluster of the set of LED clusters as a unit may cause controller 112 to use a smaller amount of computing resources as compared with individually controlling each LED, because controller 112 may send an LED cluster a single instruction instead of sending each LED within the LED cluster an instruction. In some examples, controller 112 is configured to use the second LED control mode to cause LEDs 134 to output a high-resolution message when the set of LEDs include high-resolution custom shapes. Controller 112 may cause the set of LEDs 134 to achieve the desired output (508).

The following numbered clauses may demonstrate one or more aspects of the disclosure.

Clause 1: A system includes a light-emitting diode (LED) circuit comprising a set of LEDs arranged in a formation, wherein the set of LEDs comprise a set of LED clusters, each LED cluster of the set of LED clusters comprising one or more LEDs of the set of LEDs; and a controller, The controller is configured to control, according to a first LED control mode via a first interface between the LED circuit and the controller, whether each LED of the set of LEDs is turned on or turned off; and control, according to a second LED control mode via a second interface between the LED circuit and the controller, whether each LED cluster of the set of LED clusters is turned on or turned off, wherein the first LED control mode requires the controller to use a first amount of computing resources, wherein the second LED control mode requires the controller to use a second amount of computing resources, and wherein the second amount of computing resources is lower than the first amount of computing resources.

Clause 2: The system of clause 1, wherein each LED cluster of the set of LED clusters comprises two or more LEDs of the set of LEDs.

Clause 3: The system of any of clauses 1-2, wherein to control whether each LED cluster of the set of LED clusters is turned on or turned off, the controller is configured to control the set of LED clusters so that for each LED cluster of the LED clusters, every LED of the respective LED cluster is turned on or turned off.

Clause 4: The system of any of clauses 1-3, wherein an animation sequence stored in a memory defines each LED cluster of the set of LED clusters, and wherein to control whether each LED cluster of the set of LED clusters is turned on or turned off, the controller is configured to: receive information indicating a desired output of the set of LEDs; and control, based on the information indicating the desired output, the set of LED clusters based on the animation sequence to cause the set of LEDs to output the desired output.

Clause 5: The system of clause 4, wherein the formation of LEDs comprises a grid of LEDs having a set of rows of LEDs and a set of columns of LEDs.

Clause 6: The system of clause 5, wherein each LED cluster of the set of LED clusters comprises a rectangular cluster including a first dimension of m LEDs and a second dimension of n LEDs, and wherein to control the set of LED clusters to cause the set of LEDs to output the desired output, the controller is configured to: control the set of LED clusters such that a first one or more LED clusters of the set of LED clusters that form the one or more symbols of the desired output are turned on, wherein the first one or more LED clusters form the one or more symbols of the desired output; and control the set of LED clusters such that a second one or more LED clusters of the set of LED clusters are turned off.

Clause 7: The system of clause 6, wherein the rectangular cluster represents a square cluster, and wherein the first dimension of m LEDs and the second dimension of n LEDs includes the same number of LEDs.

Clause 8: The system of any of clauses 6-7, wherein the first dimension of m LEDs and the second dimension of n LEDs includes different numbers of LEDs.

Clause 9: The system of any of clauses 5-8, wherein the animation sequence defines each LED cluster of the set of LED clusters to form a symbol on the grid of LEDs, wherein the desired output includes one or more symbols of a set of symbols, and wherein to control the set of LED clusters to cause the set of LEDs to output the desired output, the controller is configured to: control the set of LED clusters such that a first one or more LED clusters of the set of LED clusters that form the one or more symbols of the desired output are turned on; and control the set of LED clusters such that a second one or more LED clusters of the set of LED clusters that include at least one LED bordering an LED of an LED cluster of the first one or more LED clusters are turned off.

Clause 10: The system of clause 9, wherein the one or more symbols of the set of symbols includes one or more arrows.

Clause 11: The system of any of clauses 9-10, wherein the one or more symbols of the set of symbols includes one or more letters or one or more numbers.

Clause 12: The system of any of clauses 1-11, wherein the LED circuit comprises a set of switching devices, wherein each switching device of the set of switching devices corresponds to an LED of the set of LEDs, and wherein the controller is configured to control whether each LED of the set of LEDs is turned on or turned off by controlling the switching device corresponding to each LED of the set of LEDs.

Clause 13: A method comprising controlling, by a controller according to a first light-emitting diode (LED) control mode via a first interface between an LED circuit and the controller, whether each LED of a set of LEDs is turned on or turned off, wherein an LED circuit comprises the set of LEDs arranged in a formation, and wherein the set of LEDs comprise a set of LED clusters, each LED cluster of the set of LED clusters comprising one or more LEDs of the set of LEDs; and controlling, by the controller according to a second LED control mode via a second interface between the LED circuit and the controller, whether each LED cluster of the set of LED clusters is turned on or turned off, wherein the first LED control mode requires the controller to use a first amount of computing resources, wherein the second LED control mode requires the controller to use a second amount of computing resources, and wherein the second amount of computing resources is lower than the first amount of computing resources.

Clause 14: The method of clause 13, wherein controlling each LED cluster of the set of LED clusters is turned on or turned off comprises controlling the set of LED clusters so that for each LED cluster of the LED clusters, every LED of the respective LED cluster is turned on or turned off.

Clause 15: The method of any of clauses 13-14, wherein an animation sequence stored in a memory defines each LED cluster of the set of LED clusters, and wherein controlling whether each LED cluster of the set of LED clusters is turned on or turned off comprises: receiving, by the controller, information indicating a desired output of the set of LEDs; and controlling, by the controller based on the information indicating the desired output, the set of LED clusters based on the animation sequence to cause the set of LEDs to output the desired output.

Clause 16: The method of clause 15, wherein the formation of LEDs comprises a grid of LEDs having a set of rows of LEDs and a set of columns of LEDs.

Clause 17: The method of clause 16, wherein each LED cluster of the set of LED clusters comprises a rectangular cluster including a first dimension of m LEDs and a second dimension of n LEDs, and wherein controlling the set of LED clusters to cause the set of LEDs to output the desired output comprises: controlling the set of LED clusters such that a first one or more LED clusters of the set of LED clusters that form the one or more symbols of the desired output are turned on, wherein the first one or more LED clusters form the one or more symbols of the desired output; and controlling the set of LED clusters such that a second one or more LED clusters of the set of LED clusters are turned off.

Clause 18: The method of any of clauses 16-17, wherein the animation sequence defines each LED cluster of the set of LED clusters to form a symbol on the grid of LEDs, wherein the desired output includes one or more symbols of a set of symbols, and wherein controlling the set of LED clusters to cause the set of LEDs to output the desired output comprises: controlling the set of LED clusters such that a first one or more LED clusters of the set of LED clusters that form the one or more symbols of the desired output are turned on; and controlling the set of LED clusters such that a second one or more LED clusters of the set of LED clusters that include at least one LED bordering an LED of an LED cluster of the first one or more LED clusters are turned off.

Clause 19: The method of any of clauses 13-18, wherein the LED circuit comprises a set of switching devices, wherein each switching device of the set of switching devices corresponds to an LED of the set of LEDs, and wherein controlling whether each LED of the set of LEDs is turned on or turned off comprises controlling the switching device corresponding to each LED of the set of LEDs.

Clause 20: A controller configured to: control, according to a first light-emitting diode (LED) control mode via a first interface between an LED circuit and the controller, whether each LED of a set of LEDs is turned on or turned off, wherein an LED circuit comprises the set of LEDs arranged in a formation, wherein the set of LEDs comprise a set of LED clusters, each LED cluster of the set of LED clusters comprising one or more LEDs of the set of LEDs; and control, according to a second LED control mode via a second interface between the LED circuit and the controller, whether each LED cluster of the set of LED clusters is turned on or turned off, wherein the first LED control mode requires the controller to use a first amount of computing resources, wherein the second LED control mode requires the controller to use a second amount of computing resources, and wherein the second amount of computing resources is lower than the first amount of computing resources.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include RAM, ROM, programmable read only memory (PROM), erasable programmable read only memory (EPROM), EEPROM, flash memory, a hard disk, a CD-ROM, a floppy disk, a cassette, magnetic media, optical media, or other computer readable media.

Various examples have been described. These and other examples are within the scope of the following claims.

What is claimed is:

1. A vehicle lighting system configured to output light for a vehicle headlamp, the vehicle lighting system comprising:
a light-emitting diode (LED) circuit comprising a set of LEDs arranged in a formation for the vehicle headlamp, wherein the set of LEDs comprise a plurality of LED clusters, each LED cluster of the plurality of LED clusters comprising two or more LEDs of the set of LEDs; and
a controller configured to:
control, according to a first LED control mode via a first interface between the LED circuit and the controller, whether each LED of the set of LEDs is turned on or turned off in the first LED control mode to define a first lighting output of the vehicle headlamp; and
control, according to a second LED control mode via a second interface between the LED circuit and the controller, whether each LED cluster of the plurality of LED clusters is turned on or turned off in the second LED control mode to define a second lighting output of the vehicle headlamp, wherein the second lighting output of the vehicle headlamp is different than the first lighting output of the vehicle headlamp, wherein the first LED control mode causes the controller to use a first amount of computing resources, wherein the second LED control mode causes the controller to use a second amount of computing resources, and wherein the second amount of computing resources is lower than the first amount of computing resources.

2. The system of claim 1, wherein to control whether each LED cluster of the plurality of LED clusters is turned on or turned off, the controller is configured to control the plurality of LED clusters so that for each LED cluster of the LED clusters, every LED of the respective LED cluster is turned on or turned off.

3. The system of claim 1, wherein an animation sequence stored in a memory defines each LED cluster of the plurality of LED clusters, and wherein to control whether each LED cluster of the plurality of LED clusters is turned on or turned off, the controller is configured to:
receive information indicating a desired output of the set of LEDs; and
control, based on the information indicating the desired output, the plurality of LED clusters based on the animation sequence to cause the set of LEDs to output the desired output.

4. The system of claim 3, wherein the formation of LEDs comprises a grid of LEDs having a set of rows of LEDs and a set of columns of LEDs.

5. The system of claim 4, wherein each LED cluster of the plurality of LED clusters comprises a rectangular cluster including a first dimension of m LEDs and a second dimension of n LEDs, and
wherein to control the plurality of LED clusters to cause the set of LEDs to output the desired output, the controller is configured to:
control the plurality of LED clusters such that a first one or more LED clusters of the plurality of LED clusters that form one or more symbols of the desired output are turned on, wherein the first one or more LED clusters form the one or more symbols of the desired output; and
control the plurality of LED clusters such that a second one or more LED clusters of the plurality of LED clusters are turned off.

6. The system of claim 5, wherein the rectangular cluster represents a square cluster, and wherein the first dimension of m LEDs and the second dimension of n LEDs includes the same number of LEDs.

7. The system of claim 5, wherein the first dimension of m LEDs and the second dimension of n LEDs includes different numbers of LEDs.

8. The system of claim 4, wherein the animation sequence defines each LED cluster of the plurality of LED clusters to form a symbol on the grid of LEDs, wherein the desired output includes one or more symbols of a set of symbols, and
wherein to control the plurality of LED clusters to cause the set of LEDs to output the desired output, the controller is configured to:
control the plurality of LED clusters such that a first one or more LED clusters of the plurality of LED clusters that form the one or more symbols of the desired output are turned on; and
control the plurality of LED clusters such that a second one or more LED clusters of the plurality of LED clusters that include at least one LED bordering an LED of an LED cluster of the first one or more LED clusters are turned off.

9. The system of claim 8, wherein the one or more symbols of the set of symbols includes one or more arrows.

10. The system of claim 8, wherein the one or more symbols of the set of symbols includes one or more letters or one or more numbers.

11. The system of claim 1, wherein the LED circuit comprises a set of switching devices, wherein each switching device of the set of switching devices corresponds to an LED of the set of LEDs, and wherein the controller is configured to control whether each LED of the set of LEDs is turned on or turned off by controlling the switching device corresponding to each LED of the set of LEDs.

12. A method of controlling a vehicle lighting system that outputs light for a vehicle headlamp, the method comprising:
controlling, by a controller according to a first light-emitting diode (LED) control mode via a first interface between an LED circuit and the controller, whether each LED of a set of LEDs is turned on or turned off in the first LED control mode to define a first lighting output of the vehicle headlamp, wherein an LED circuit comprises the set of LEDs arranged in a formation for the vehicle headlamp, and wherein the set of LEDs comprise a plurality of LED clusters, each LED cluster of the plurality of LED clusters comprising two or more LEDs of the set of LEDs; and
controlling, by the controller according to a second LED control mode via a second interface between the LED circuit and the controller, whether each LED cluster of the plurality of LED clusters is turned on or turned off in the second LED control mode to define a second lighting output of the vehicle headlamp, wherein the second lighting output of the vehicle headlamp is different than the first lighting output of the vehicle headlamp,
wherein the first LED control mode causes the controller to use a first amount of computing resources, wherein the second LED control mode causes the controller to use a second amount of computing resources, and wherein the second amount of computing resources is lower than the first amount of computing resources.

13. The method of claim 12, wherein controlling each LED cluster of the plurality of LED clusters is turned on or turned off comprises controlling the plurality of LED clusters so that for each LED cluster of the LED clusters, every LED of the respective LED cluster is turned on or turned off.

14. The method of claim 12, wherein an animation sequence stored in a memory defines each LED cluster of the plurality of LED clusters, and wherein controlling whether each LED cluster of the plurality of LED clusters is turned on or turned off comprises:
receiving, by the controller, information indicating a desired output of the set of LEDs; and
controlling, by the controller based on the information indicating the desired output, the plurality of LED clusters based on the animation sequence to cause the set of LEDs to output the desired output.

15. The method of claim 14, wherein the formation of LEDs comprises a grid of LEDs having a set of rows of LEDs and a set of columns of LEDs.

16. The method of claim 15, wherein each LED cluster of the plurality of LED clusters comprises a rectangular cluster including a first dimension of m LEDs and a second dimension of n LEDs, and
wherein controlling the plurality of LED clusters to cause the set of LEDs to output the desired output comprises:
controlling the plurality of LED clusters such that a first one or more LED clusters of the plurality of LED clusters that form one or more symbols of the desired output are turned on, wherein the first one or more LED clusters form the one or more symbols of the desired output; and
controlling the plurality of LED clusters such that a second one or more LED clusters of the plurality of LED clusters are turned off.

17. The method of claim 15, wherein the animation sequence defines each LED cluster of the plurality of LED clusters to form a symbol on the grid of LEDs, wherein the desired output includes one or more symbols of a set of symbols, and wherein controlling the plurality of LED clusters to cause the set of LEDs to output the desired output comprises:
controlling the plurality of LED clusters such that a first one or more LED clusters of the plurality of LED clusters that form the one or more symbols of the desired output are turned on; and
controlling the plurality of LED clusters such that a second one or more LED clusters of the plurality of LED clusters that include at least one LED bordering an LED of an LED cluster of the first one or more LED clusters are turned off.

18. The method of claim 12, wherein the LED circuit comprises a set of switching devices, wherein each switching device of the set of switching devices corresponds to an LED of the set of LEDs, and wherein controlling whether each LED of the set of LEDs is turned on or turned off comprises controlling the switching device corresponding to each LED of the set of LEDs.

19. A controller configured to control a vehicle lighting system that outputs light for a vehicle headlamp, wherein the controller is configured to:

control, according to a first light-emitting diode (LED) control mode via a first interface between an LED circuit and the controller, whether each LED of a set of LEDs is turned on or turned off in the first LED control mode to define a first lighting output of the vehicle headlamp, wherein an LED circuit comprises the set of LEDs arranged in a formation for the vehicle headlamp, wherein the set of LEDs comprise a plurality of LED clusters, each LED cluster of the plurality of LED clusters comprising two or more LEDs of the set of LEDs; and control, according to a second LED control mode via a second interface between the LED circuit and the controller, whether each LED cluster of the plurality of LED clusters is turned on or turned off in the second LED control mode to define a second lighting output of the vehicle headlamp, wherein the second lighting output of the vehicle headlamp is different than the first lighting output of the vehicle headlamp, wherein the first LED control mode causes the controller to use a first amount of computing resources, wherein the second LED control mode causes the controller to use a second amount of computing resources, and wherein the second amount of computing resources is lower than the first amount of computing resources.

* * * * *